US006978862B1

(12) United States Patent
Cotten, Sr.

(10) Patent No.: US 6,978,862 B1
(45) Date of Patent: Dec. 27, 2005

(54) MOBILE DEER STAND

(76) Inventor: David W. Cotten, Sr., Rt. 2, Box 42, Charleston, MS (US) 38921

(*) Notice: Subject to any disclaimer, the term of this patent is extended or adjusted under 35 U.S.C. 154(b) by 0 days.

(21) Appl. No.: 10/413,819

(22) Filed: Apr. 15, 2003

(51) Int. Cl.$^7$ .............................................. E04C 1/00
(52) U.S. Cl. ..................................... 182/127; 182/63.1
(58) Field of Search .............................. 182/127, 63.1, 182/113, 115, 129, 69.5, 69.6

(56) References Cited

U.S. PATENT DOCUMENTS

| | | | |
|---|---|---|---|
| 6,523,641 B2 * | 2/2003 | Smith ......................... | 182/63.1 |
| 6,550,575 B2 * | 4/2003 | Spencer et al. ............ | 182/63.1 |
| 2002/0134620 A1 * | 9/2002 | Meyer ........................ | 182/127 |
| 2002/0139613 A1 * | 10/2002 | Hardy et al. ............... | 182/63.1 |
| 2002/0157899 A1 * | 10/2002 | Smith ......................... | 182/63.1 |
| 2003/0178251 A1 * | 9/2003 | Hewitt ....................... | 182/63.1 |
| 2004/0074697 A1 * | 4/2004 | Berzowski .................. | 182/127 |

* cited by examiner

Primary Examiner—Bruce A. Lev
(74) Attorney, Agent, or Firm—Wyatt, Tarrant & Combs, L.L.P.

(57) ABSTRACT

A trailer mounted deer stand including a vertical tower attached to the chassis of the trailer and a pivotally mounted blind rotatable from a lowered, travel position to an upright, operational position for observation at spectator events including hunting. The trailer includes an extended tongue, through the trailer chassis and rearward to clear the lowered blind and a coupling beam disposed in an upwardly open channel mounted on the tongue, the coupling bean at one end attachable to an immoveable object such as a tree and at the other end coupled to a lifting boom attached to the blind. Upon securing the coupling beam to the immoveable object, and moving the trailer forward and away from the immoveable object, the relative movement of the coupling beam on the tongue causes the lifting boom to move upwardly toward the blind whereby it may be moved to the upright position. In its preferred embodiments, the mobile deer stand may include a ramp and platform for loading and carrying an all terrain vehicle and a locker for storage of hunting gear.

25 Claims, 12 Drawing Sheets

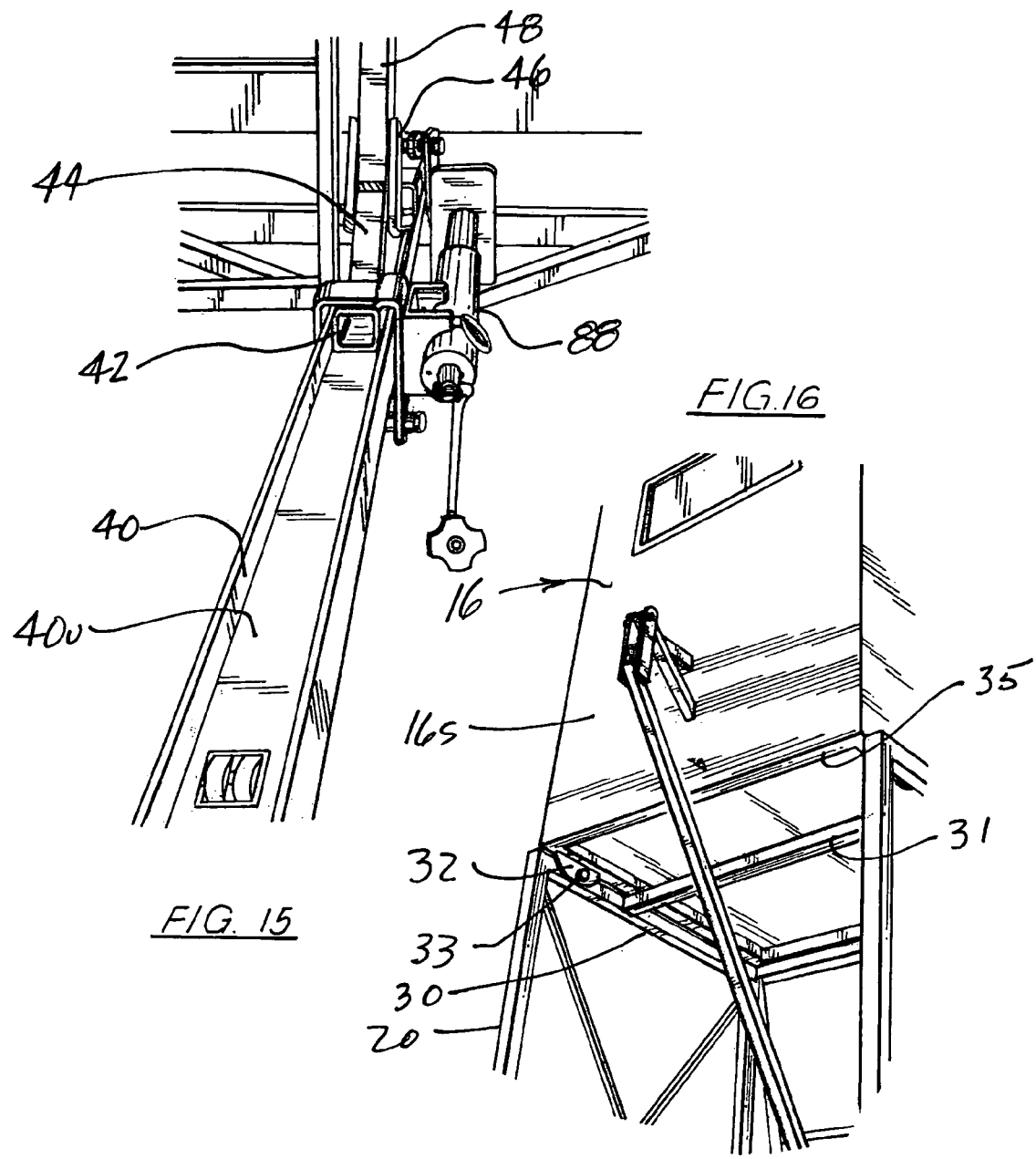

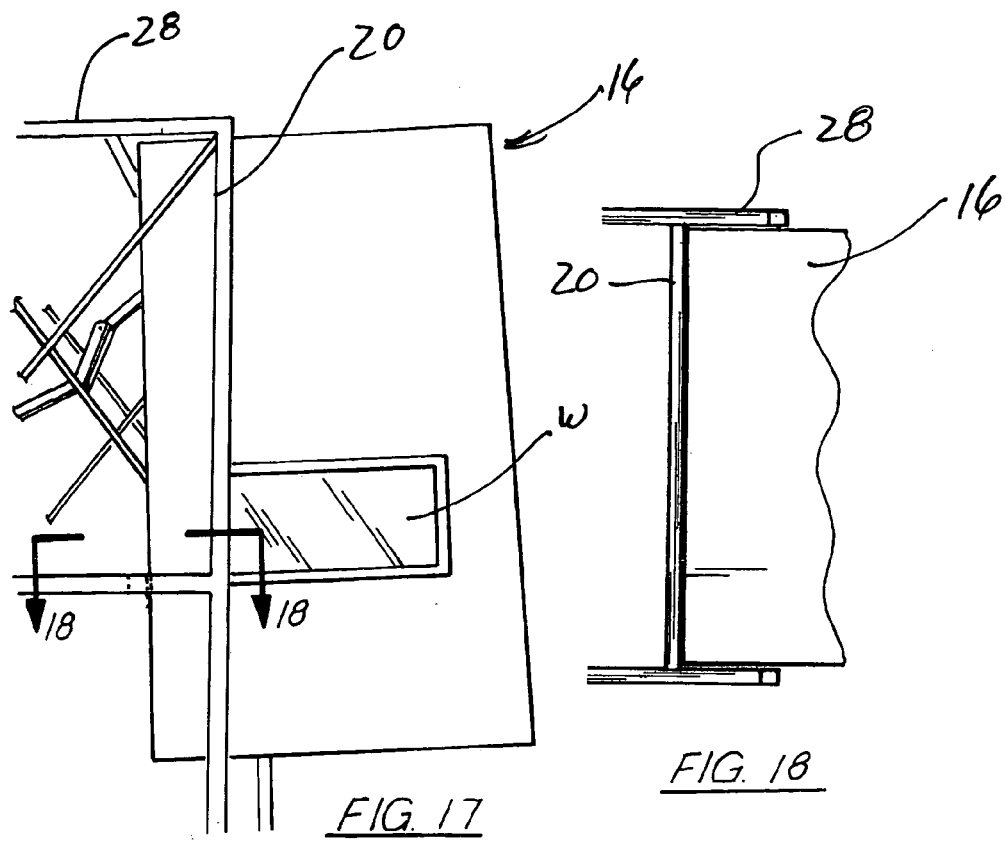
FIG. 17
FIG. 18
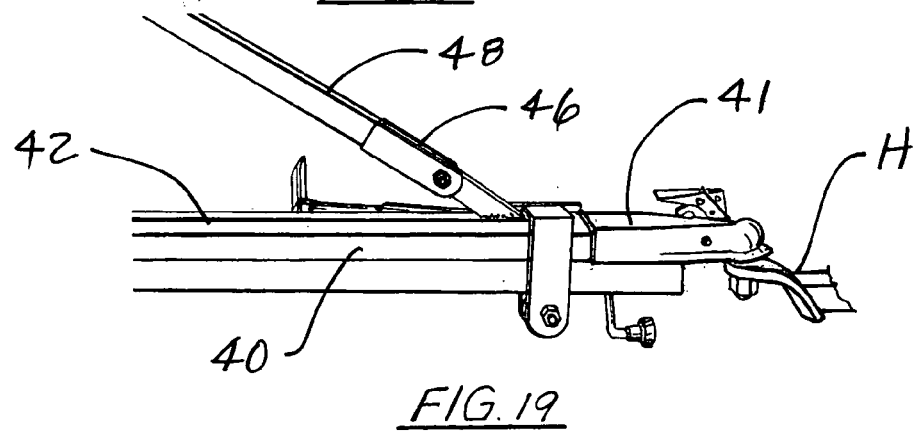
FIG. 19

MOBILE DEER STAND

CROSS REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention relates to mobile deer stands and more particularly, an elevating stand which is permanently mounted on a trailer.

BACKGROUND OF THE INVENTION

Hunters, particularly of deer, utilize blinds and elevated towers to cover themselves from sight of the prey and elements of the weather as well as to gain a better vantage from which to fell their game. Given that the hunting is done in the wood, and hunters for sport usually live in a distant, likely populated place, there is need of a transportable tower and blind. Further, it is custom for the hunter to have significant equipment which must also be transported. The desirable blind will be trailer mounted so that it may be pulled along public highways, preferably at higher speeds as in interstate highway travel so it must have a lower, secure profile when in the stored position. Advantageously, the trailer mounted blind has room for a closeable, waterproof storage box and ideally, a three or four wheeled off road vehicle such as the well known all-terrain vehicle (ATV). The ATV is advantageous in that the final site for location of the blind may be at some distance from a roadway or path, requiring other than the normal pick-up truck or sports utility vehicle for the final several hundred yards of movement.

There have been numerous attempts at a suitable mobile blind or deer stand, as represented by several of the many patents which have issued over a considerable span of years. Among these are U.S. Pat. No. 6,347,684 to Fath, et al; U.S. Pat. No. 5,409,081 to Reeves and U.S. Pat. No. 4,442,919 to Fulcher. For lack of a more precise description, these hunting stands are essentially fully assembled and carried on a wheeled vehicle and made operational by tilting the assemblage to the upright position. Their management is cumbersome, and usually requires more than one person for set-up.

Another typical construction is a vertically lifted style as represented by patents U.S. Pat. No. 4,719,716 to Chrisley, U.S. Pat. No. 5,102,179 to Royer and U.S. Pat. No. 5,862,827 to Howze. The deer stand of the '716 patent is raised to the vertical by pivoting the legs about fixed points to the vertical by means of a pulley system. The base may be on a trailer or on a fixed base. The stand of the '179 patent is raised vertically on telescoping legs by means of a pulley system powered by a hand crank or an electric motor. The stand of the '827 patent is also raised vertically on telescoping legs by means of a pulley system operated by a hand crank winch on the carrying trailer. These stands are generally complicated and prone to require periodic maintenance.

The deer stand illustrated in U.S. Pat. No. 5,295,555 to Strange is raised much like the ladder of a "hook and ladder" fire engine, utilizing a hydraulic lift. The tower retains its upright orientation through the lifting from is lowered position on the carry trailer to the upright or elevated position. The typical hunting tower is utilized in remote areas and separate hydraulic power means is seldom available on normal tow vehicles (pick-up trucks and ATV's).

A final style of deer stand is illustrated in U.S. Pat. No. 6,290,023 to Martin wherein the supporting tower is assembled in the field at the site with the tailgate of the carrying trailer forming the floor of the elevated platform/enclosure by backing the trailer into the legs (a triangular arrangement being illustrated) whereby two of the legs gain a purchase in the terrain of the site such that the triangular tower rotates to an upright position. In this position, the tailgate/floor is parallel to the terrain, and bowed supports forming a cover for the trailer are moved to the platform to form a covering for the tower platform. Assembly of the tower is obviously complex and an large vehicle is necessary to elevate the tower, thus requiring a prepared way to the tower's final site.

The present invention overcomes several shortcomings of these prior art stands, as will be evident from the succeeding description.

SUMMARY OF THE INVENTION

It is an object of the invention to provide a mobile deer stand (or observation tower for other spectator events) that may be raised and lowered by a single person, may be pulled on public highways at up to interstate speeds, and requires little, if any, maintenance. In the present invention the raised and lowered blind is pivotally mounted on a tower secured to a trailer, such as being welded to the frame of a utility trailer. The trailer is equipped with an elongated towing tongue which extends through the trailer frame to a distance beyond the chassis and includes an upwardly opening channel disposed over essentially the full extent of the tongue, which has disposed therein a slideable coupling beam to which is attached a lifting boom for rotating the blind to its upward or lowered positions. The slideable coupling beam is selectably anchored to an immoveable object, such as a tree behind the trailer, and the trailer pulled forward by the tongue to cause relative motion of the coupling beam and elevation of the lifting boom as it pivots the blind into its upright position, after which the tower/trailer assembly may be stabilized by various jacking stands and the tongue and beam secured against unwanted relative movement.

In its preferred embodiments the mobile deer stand may include a waterproof gear storage box, a ramp and platform for loading and carrying an all terrain vehicle. Additionally, the blind may include closeable windows and door for protection from the elements.

The foregoing and other objects, features, aspects and advantages of the invention will become more apparent from the following detailed description of the invention when considered in conjunction with the accompanying drawings.

BRIEF DESCRIPTION OF THE DRAWINGS

FIG. 14 is a partial pictoral view of the lateral brace illustrated in FIG. 1.

FIG. 15 is a partial view of the beam channel illustrated in FIGS. 1, 7, 8 and 10.

FIG. 16 is a partial view of the rear of the blind showing the orientation of the rotating link.

FIG. 17 is partial side view of the blind in the lowered position.

FIG. 18 is a partial sectional view taken on line 18—18 in FIG. 17 showing the blind in the lowered position.

FIG. 19 is a partial pictoral view of the trailer tongue illustrated in FIGS. 1 through 4.

PREFERRED EMBODIMENTS OF THE INVENTION

In the following detailed description of the preferred embodiments, reference is made to the accompanying drawings which form a part hereof, and in which are shown specific embodiments in which the invention may be practiced. It is to be understood that other embodiments maybe utilized and structural changes within the skill of the art may be made without departing from the scope of the present invention.

Figure 1:
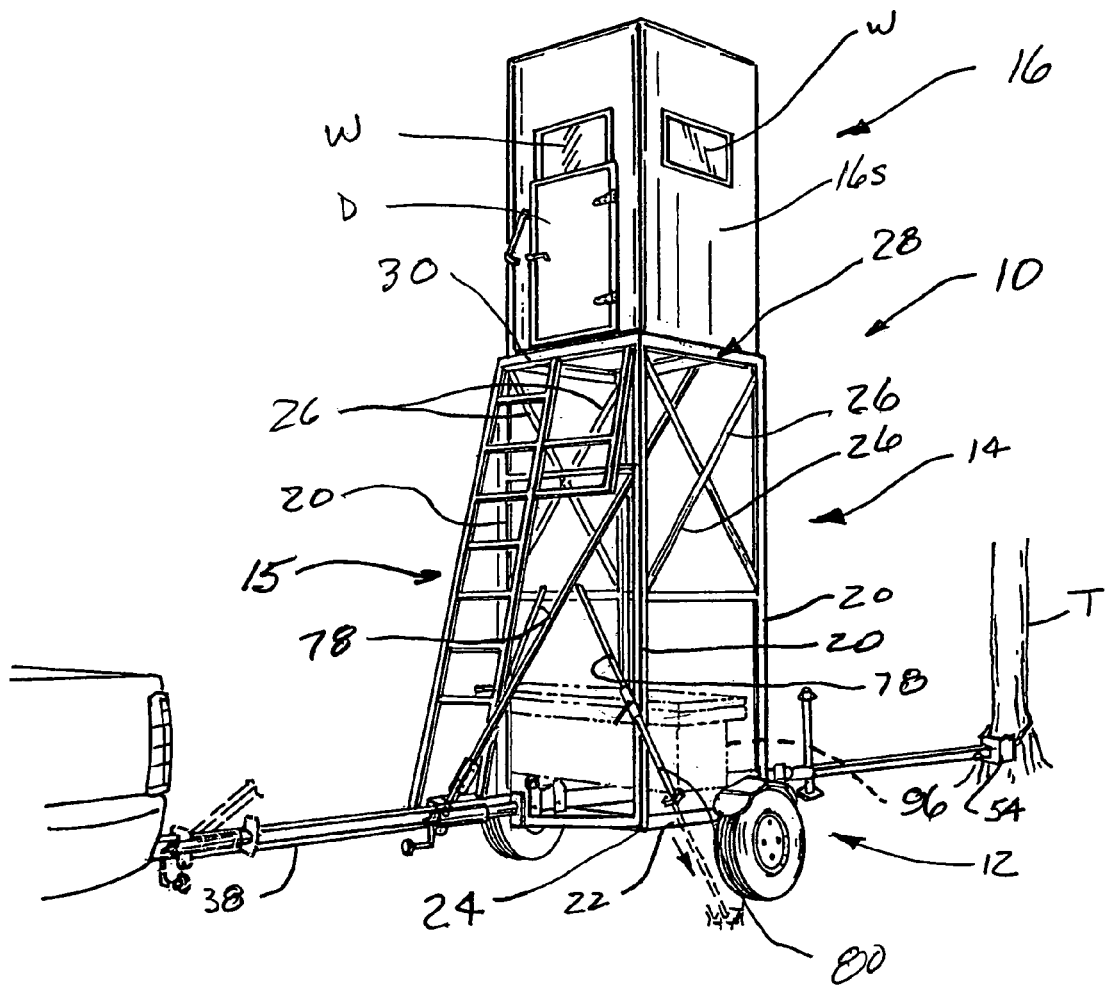
FIG. 1 is a pictorial view of the of the mobile deer stand of the present invention shown in upright position.
Figure 3:
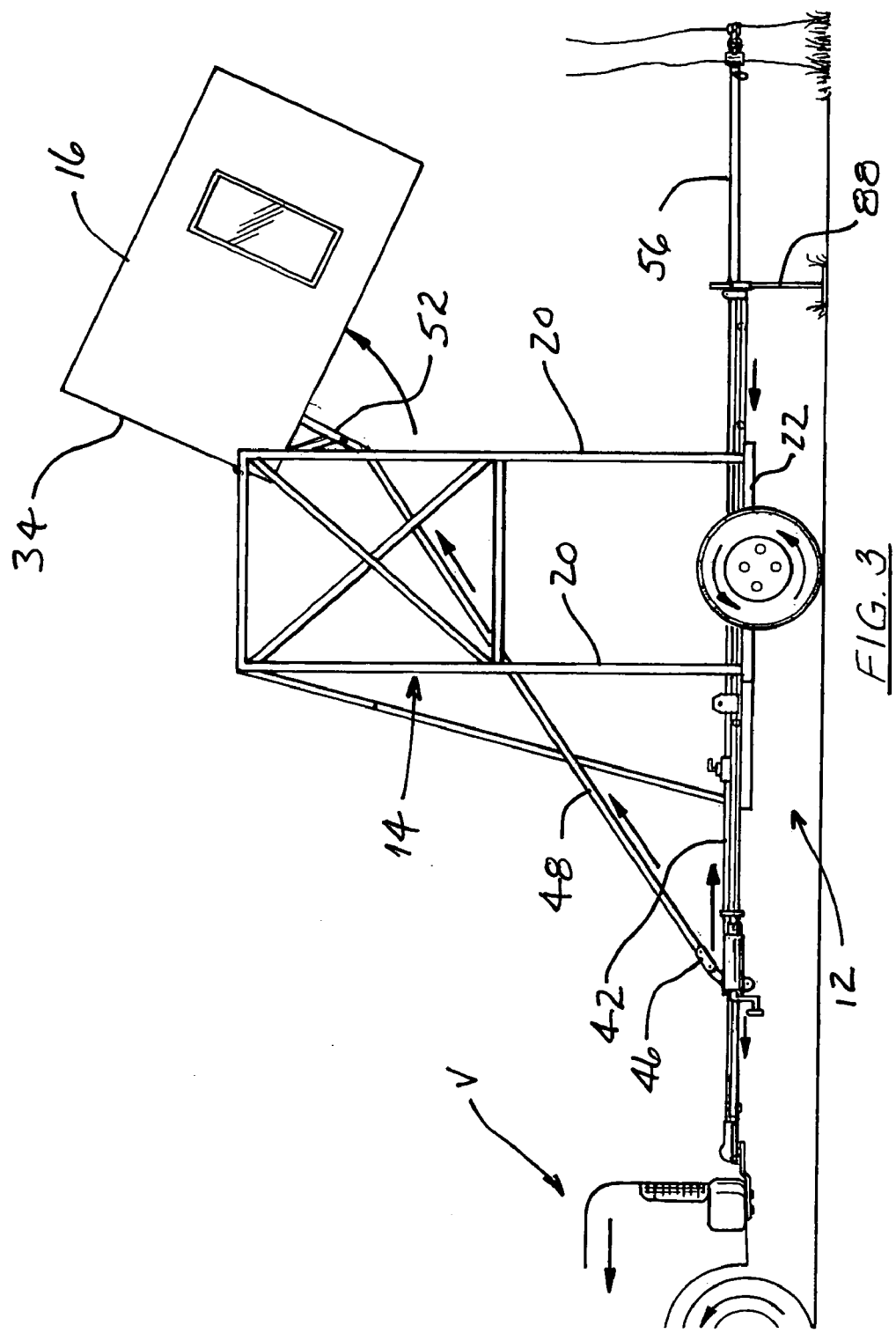
FIG. 3 is a side elevation view of the invention illustrated in FIG. 2 with the blind partially raised.
Figure 4:
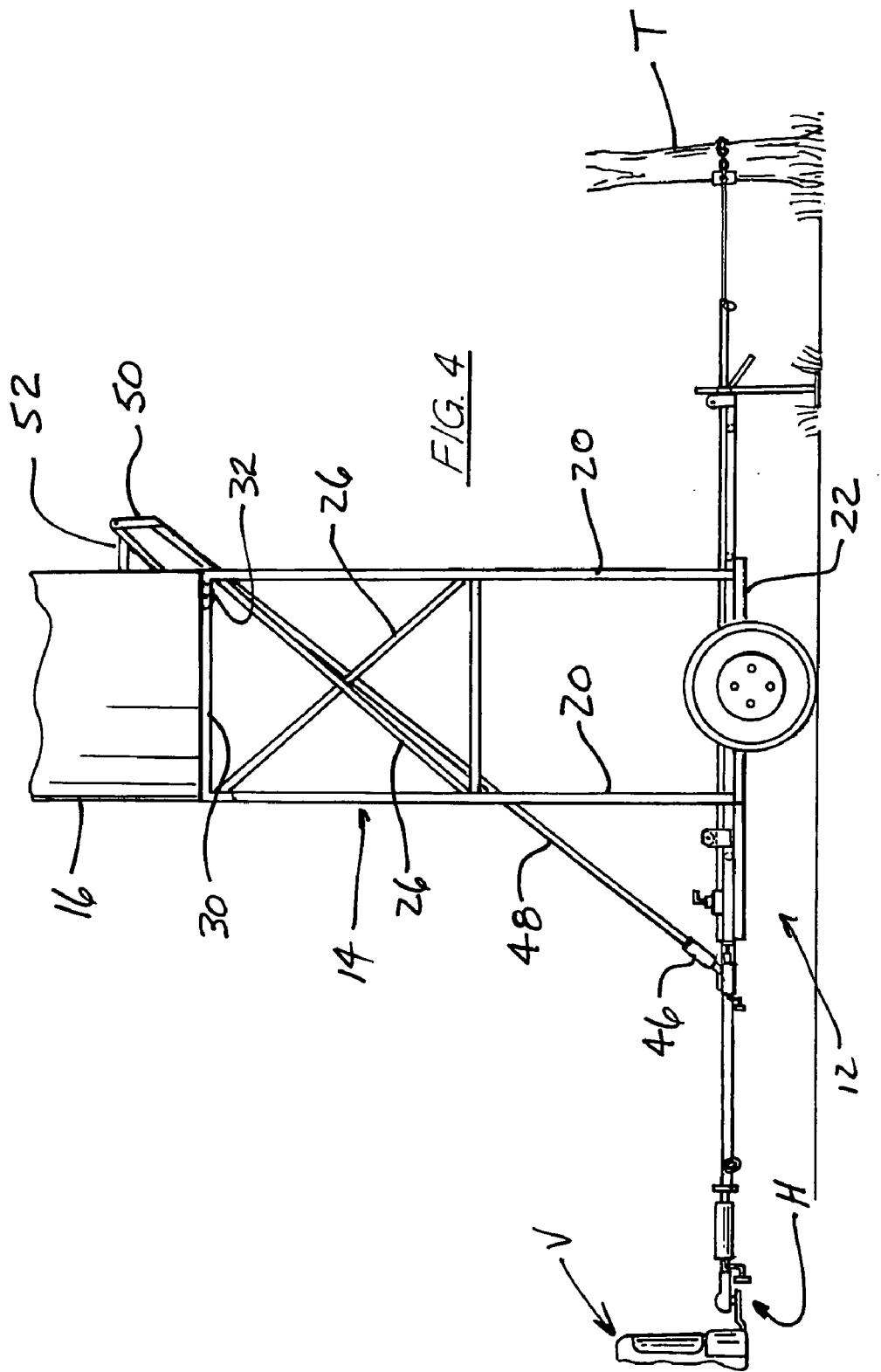
FIG. 4 is a side elevation view of the invention illustrated in FIG. 2 with the blind in the fully raised position.

As shown in FIG. 1, the present invention is a mobile hunting stand 10, which in its preferred embodiment consists of a trailer 12, a tower 14 securely mounted on the trailer 12, and a blind 16 which is shown in an upright position. As is illustrated in FIGS. 2–4, the blind 16 is mounted on tower 14 in a pivoting relationship such that blind 16 may be rotated from a transit position (FIG. 2) to the upright, use position illustrated in FIGS. 1 and 4.

Trailer 12 may be a conventional utility trailer chassis upon which tower 14 is secured. In the illustrated embodiment, tower 14 has four main struts 20 which are secured to trailer 12 as at chassis 22 by weldment, bolts, or the like. Tower 14 includes cross braces 26 on the sides of tower 14 to provide added structural integrity to the tower 14 for carrying blind 16. At the top of legs 20, a base frame 28 composed of side rails 30 and center rail 31 form a platform upon which blind 16 rests upon when upright. Blind 16 is pivotally attached to frame 28 on lateral side rails 30 by means of pivot plates 32 extending from the base 34 of blind 16 made up of base rails 35 forming preferably a rectangular support for blind 16. Pivot plates 32 are mounted for rotational movement on side rails 30 by means of a bolt/shaft arrangement forming pivot pins 33 which receive pivot plates 32 thereon. Blind 16 also includes a door D and windows W for access and viewing. Windows may include a pane such that the window opening may be closed to the elements, or comprise a simple opening in the side 16s of the blind 16.

As previously mentioned, trailer 12 may be a common two-wheeled utility trailer chassis as may be pulled by such as a pick-up truck, sports utility vehicle or van. To accommodate the blind 16 of the instant invention, trailer chassis 22 is adapted with a tongue-on-beam feature. Trailer 12 includes the usual tongue 38 for attachment to a hitch H on the towing vehicle, except that the tongue extends through the body of the trailer 12 to a distance rearward thereof. Additionally, tongue 38 is adapted with an upwardly opening channel 40 (FIGS. 10–12 and 16) throughout its length from the hitch member 41 for the length of the tongue 38, extended. Within the channel 40 is a coupling beam 42 which extends from a shuttle 44 which is disposed adjacent hitch member when the blind 16 is in its lowered position (FIG. 1). Shuttle 44 is attached also to lifting link 46 which is disposed at one end of lifting boom 48, the other end of which is attached to rotating link 50 which is pivotally attached to bracket 52 on blind 16.

Figure 2:
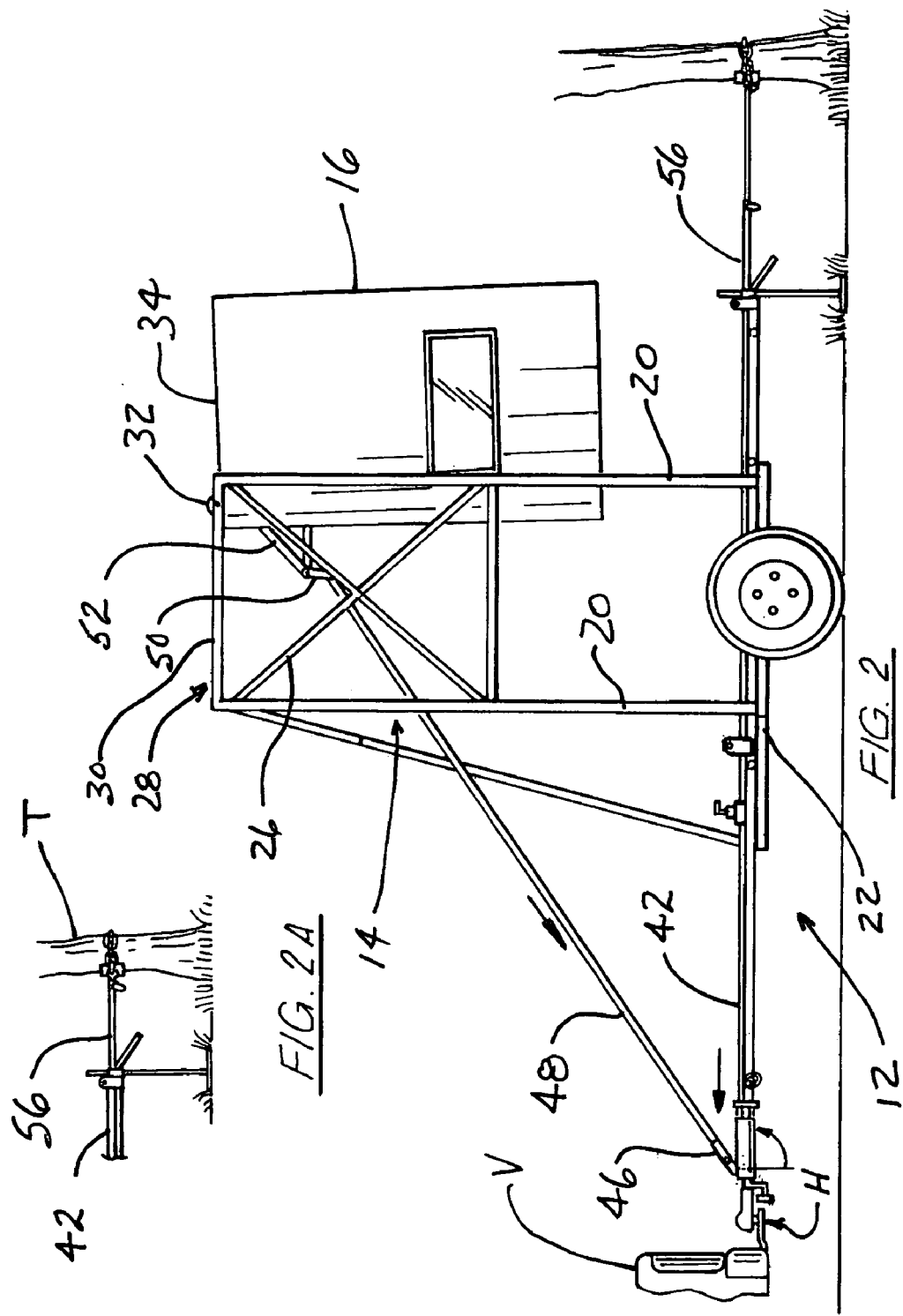
FIG. 2 is a side elevation view of the invention of FIG. 1 wherein the blind is in the lowered position.
Figure 5:
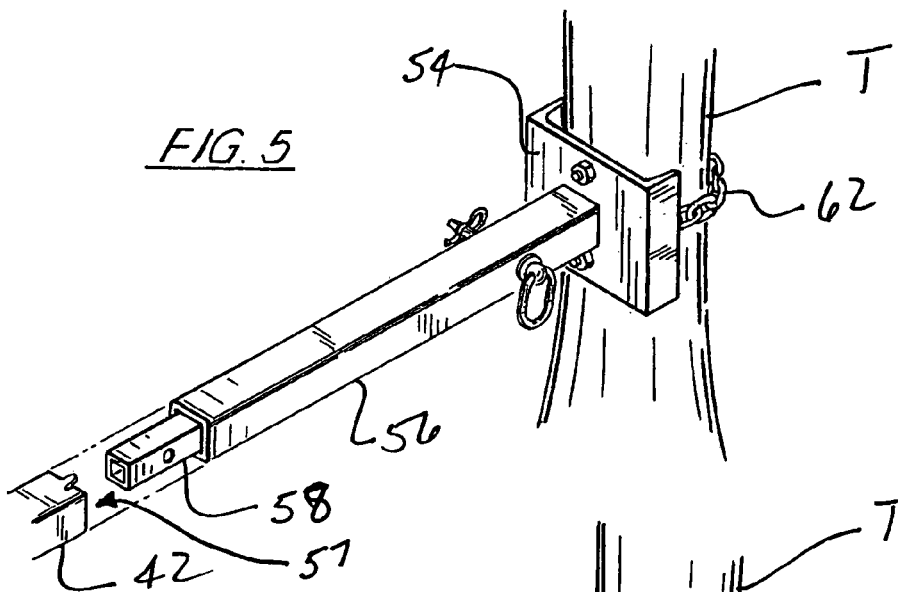
FIG. 5 is a pictorial view of the anchor shoe and beam extension of the invention illustrated in FIG. 2.
Figure 6:
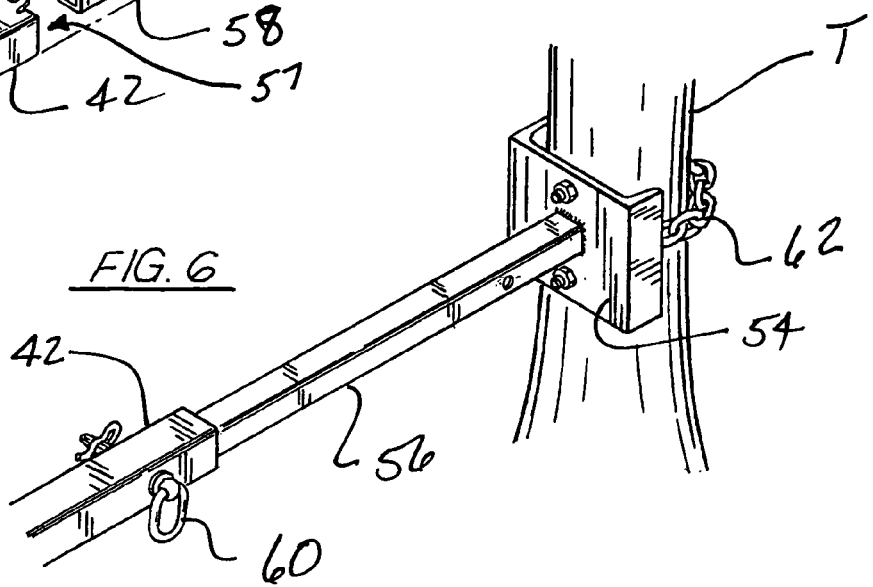
FIG. 6 is a pictorial view of the anchor shoe and beam extension illustrated in FIG. 5, shown in assembled condition.

Coupling beam 42 extends in channel 40 from lift link 46 adjacent hitch member when the blind 16 is in the lowered position to beyond the extent of beam channel 40 a distance clear of, or beyond the lateral extent of the lowered blind 16 (FIG. 2). In the illustrated embodiment (FIGS. 5 and 6) coupling beam 42 terminates with an anchor shoe 54 mounted on the end of beam extension 56. Extension 56 is received in locking relationship with the end of coupling beam 42, beam 42 being a closed channel 57 configuration and extension 56 having a key end 58 which is closely received (FIG. 5) into the closed channel 57, preferably being releasably secured therein with a conventional pin 60. As illustrated in FIGS. 5 and 6, anchor shoe 54 is attached to an immoveable object when blind is to be rotated to its upright position, ready for use. Anchor shoe 54 is preferably attachable to an immoveable object (tree T) such as a tree T, illustrated in the figures, with a chain 62, the chain 62 being attached by means of an eye 64, or by such as weldment Z securing a link 64 to the shoe 54. Those skilled in the art will recognize that alternative means of attachment and of holding devices may also be used.

It is advantageous that friction reducing means be disposed between the operative surfaces of channel 40 and the underside of actuating tongue 42, to facilitate their interaction during the process of raising blind 16. Trailer tongue 38 includes such as roller bearings 66 (FIGS. 11, 12) mounted such that the surfaces 66s of bearings 66 are exposed above the upper surface 40u of channel 40 such that the bottom surface 42b of coupling beam 42 may easily glide over channel 40. Roller bearings 66 may be disposed at convenient locations along channel 40 to ensure ease of relative movement between trailer tongue 38 and coupling beam 42 throughout their normal range of motion as is illustrated in FIGS. 2 through 4. Additionally, shuttles 44 including such as roller 68 mounted on bracket 70 attached to the trailer tongue extension 39 (FIG. 8) and roller 74 mounted on bracket 76 attached to the forward end of coupling beam 42 (FIG. 10) cause the tongue 38 and beam 42 to be retained in channel 40 throughout relative movement and at the completion thereof, whether blind is set for hunting or travel. Those skilled in the art should appreciate that other configurations of friction reducing devices, including low friction surfaces as fluoropolymers (i.e., ptfe) may be employed to facilitate the interaction of tongue 38 and beam 42 during raising and lowing of blind 16.

Figure 8:
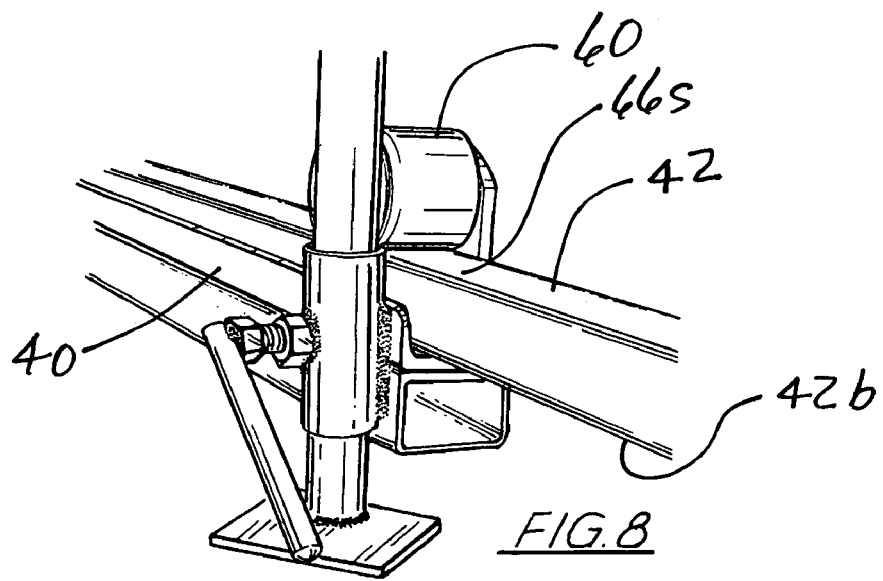
FIG. 8 is a partial pictorial view of the jack stand and beam roller mount of the invention illustrated in FIG. 2.
Figure 9:
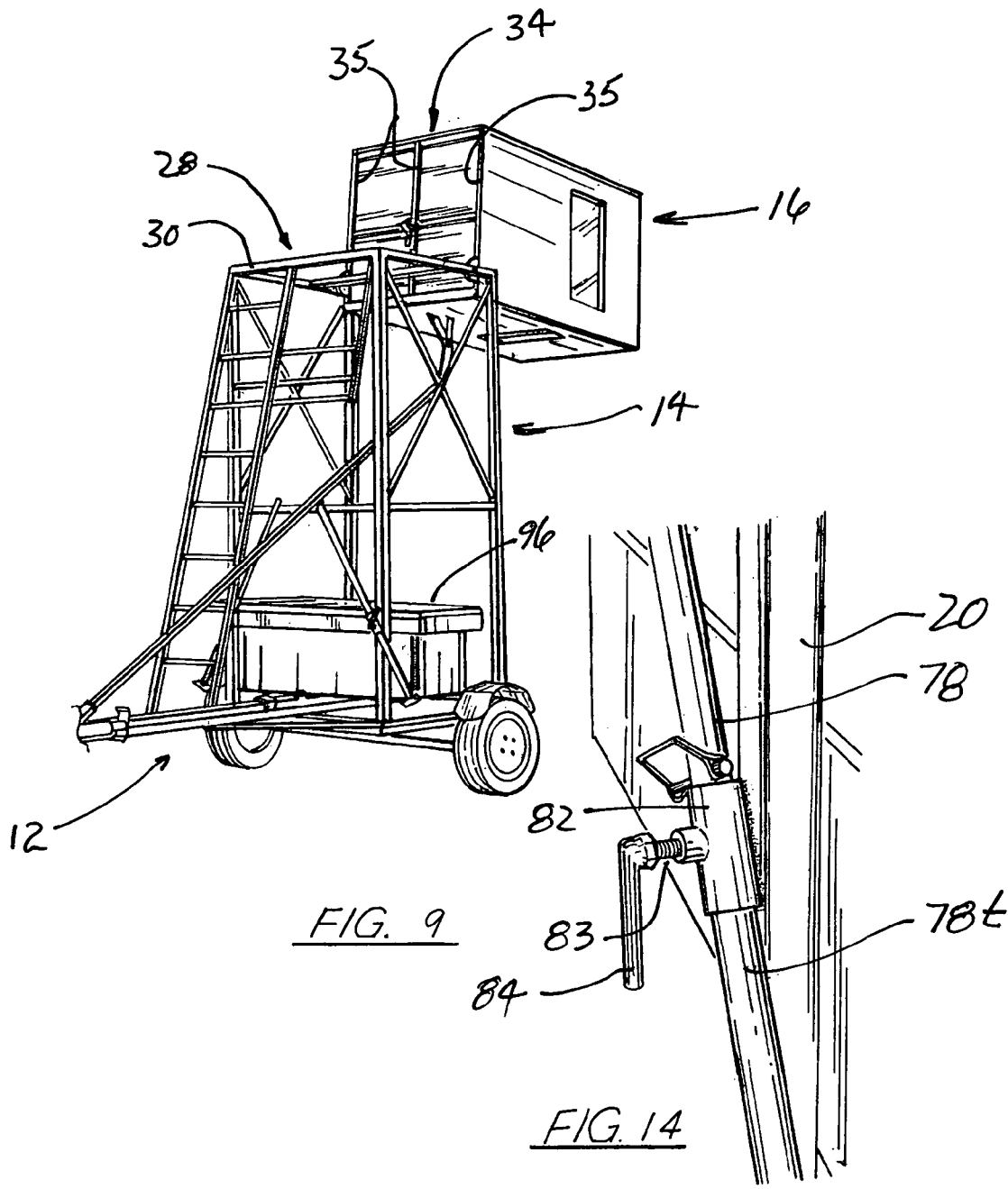
FIG. 9 is a partial pictoral view of the tower and blind, with the blind intermediate the lowered and upright positions.

FIGS. 2 though 4 illustrate the rotation of blind 16 from the lowered or travel position (FIG. 2) to the upright or hunting position (FIG. 4). With anchor shoe 54 secured to such as a tree T, and the hitch member 41 engaged with the ball of hitch H, vehicle V is advanced to pull trailer 12 by means of trailer tongue 38. As vehicle V moves leftwardly, as illustrated, coupling beam 42, and lift link 46 (attached to coupling beam tongue 42 at its end) cause the lift link 46 to move relatively toward the right with respect to tower 14 and trailer 12 in the figures. This relative movement causes lifting boom 48 to rotate blind 16 around pivot pins 33 in pivot plates 32 until blind 16 is upright and resting on tower frame 28. Once the blind is fully upright, mobile hunting stand 10 may be stabilized by lateral braces 78 such as a tubular section 78*t* as illustrated in FIG. 1, including extension legs 80 which are moved out of the tubular section 78*t* until in firm contact with the ground, at which time lock 82 such as a friction screw 83 with a handle 84 for leverage is tightened to secure the extension leg 80. Additionally, mobile hunting stand is secured along the tongue line 38, 42 by stands 86 and 88, as illustrated in FIGS. 1 through 4 and 8, 10 and 13. Stands 86, 88 are well known in the art of trailers and may be of the vertically operated type as illustrated in FIG. 8 or the pivoting and angularly extending type illustrated in FIG. 10. In the illustrated embodiment stands 86 and 88 are conveniently incorporated into the shuttles 44 and mounting brackets 70 and 76 incorporating rollers 68 and 74.

Figure 7:
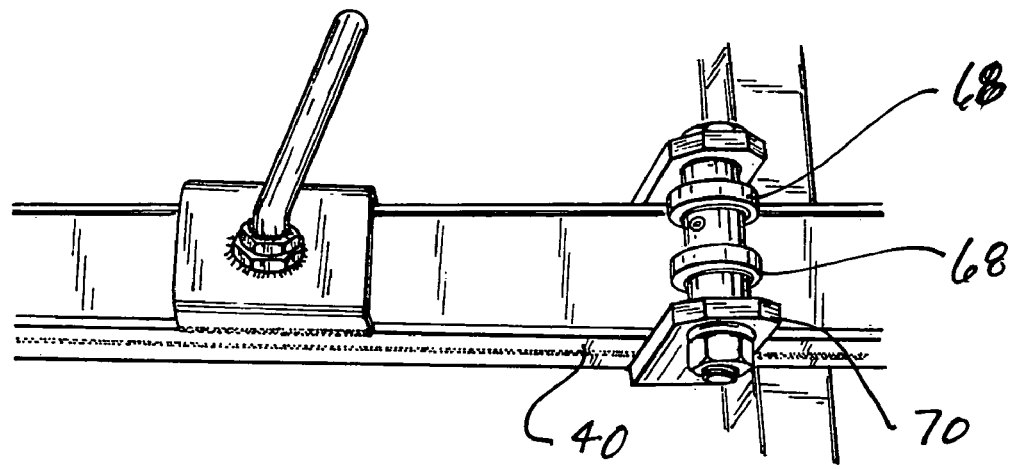
FIG. 7 is a partial pictorial view of the anchor beam lock of the invention illustrated in FIG. 2.
Figure 10:
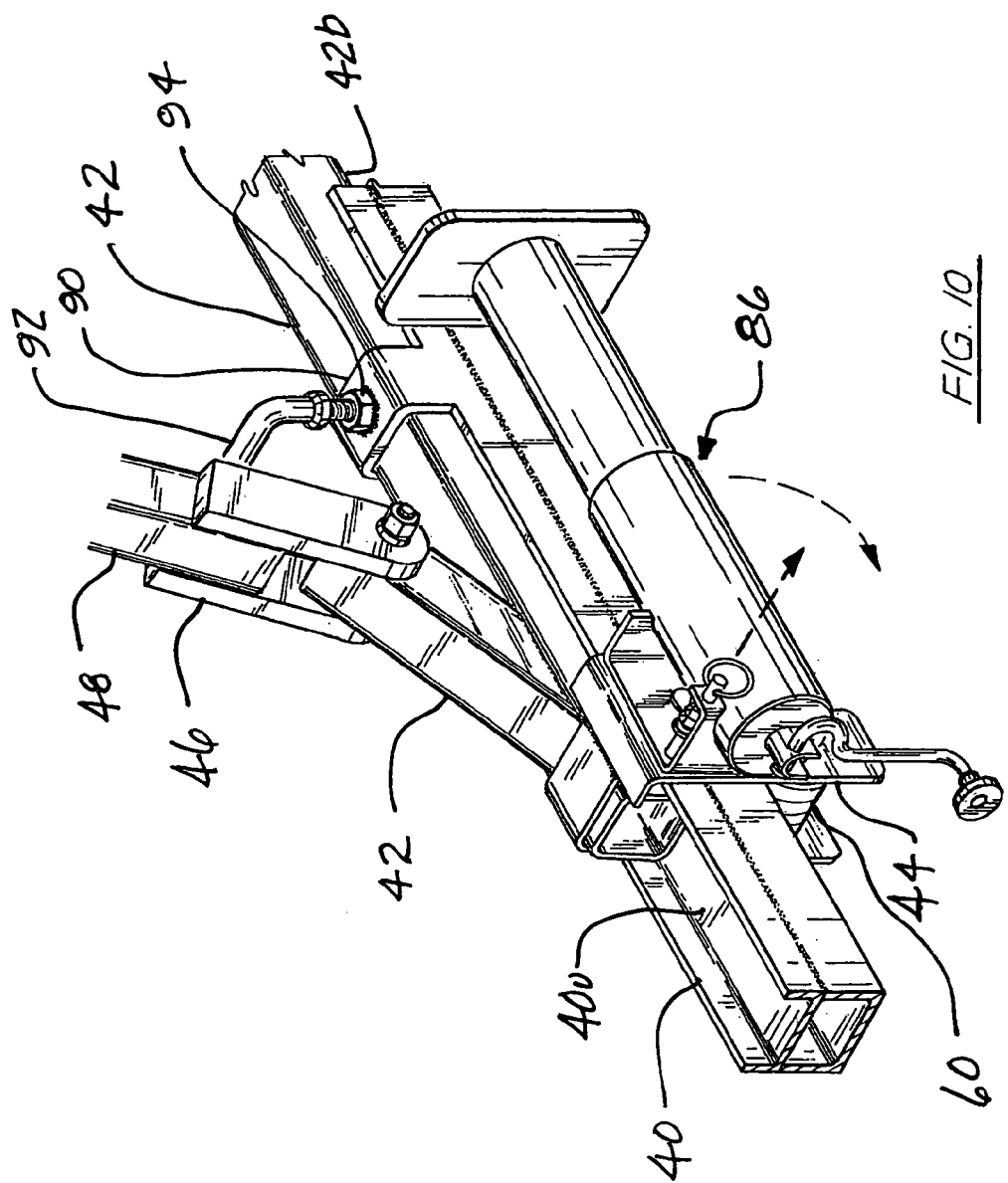
FIG. 10 is a partial pictorial view of the channel and tongue of the mobile deer stand of FIG. 1 and the lifting link and lifting boom attached thereto.
Figure 11:
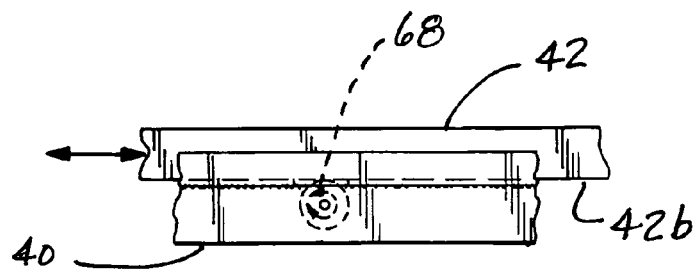
FIG. 11 is a partial side view of the tongue and beam including roller means of the mobile deer stand illustrated in FIG. 1.
Figure 12:
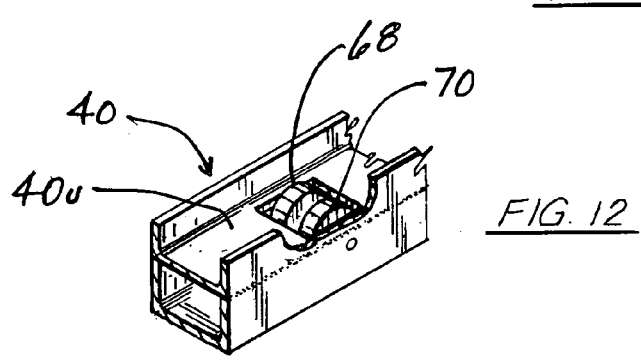
FIG. 12 is a partial pictorial view with the channel partially cut away showing the roller illustrated in FIG. 11.
Figure 13:
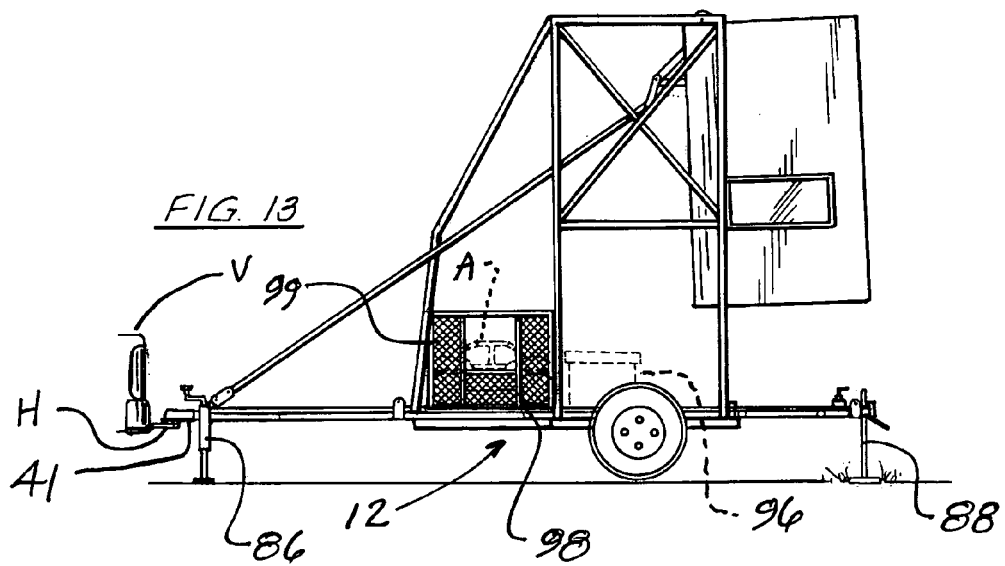
FIG. 13 is a side elevation of an alternative embodiment of the mobile deer stand illustrated in FIG. 1, with the blind lowered and including a ramp and platform for an all terrain vehicle and a gear storage box.
Figure 20:
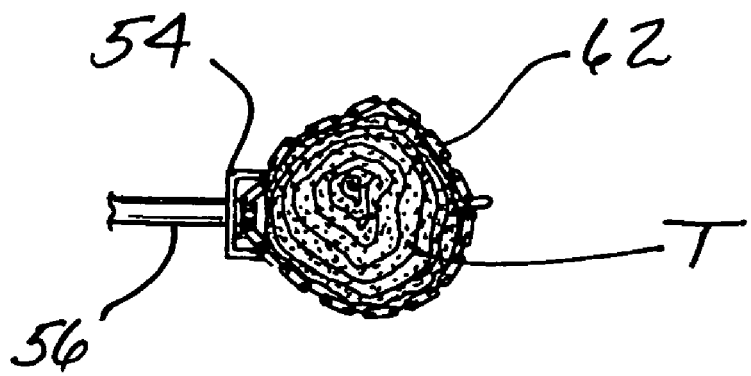
FIG. 20 is a cross sectional view of the anchor shoe when secured against a tree.
Figure 21:
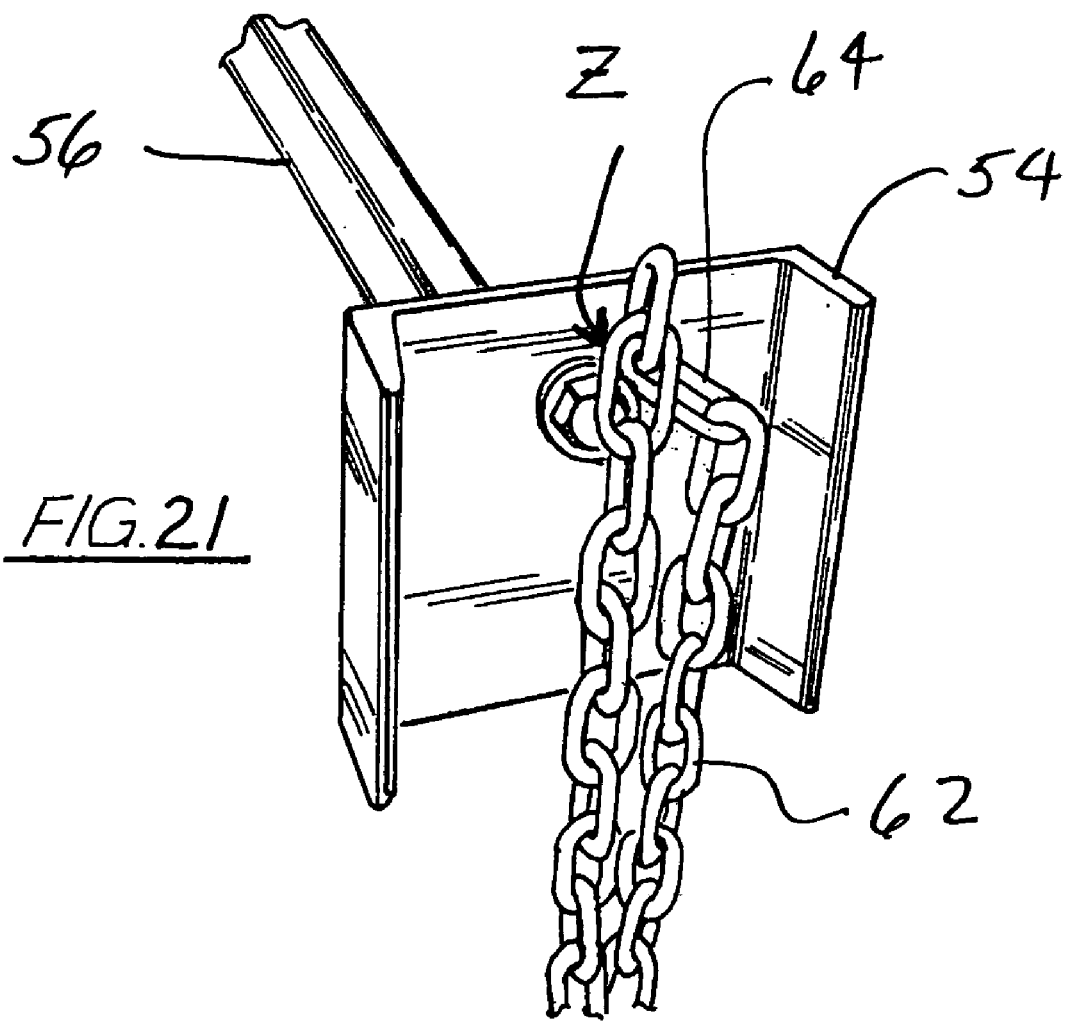
FIG. 21 is a partial pictoral view of the anchor shoe illustrated in FIGS. 5, 6 and 20.

Tongue lock 90 is preferably installed on channel 40 ahead of trailer 12 to ensure that there is no relative motion between tongue 38 and coupling beam 42 once the mobile hunting stand 10 is in place and the blind 16 readied for occupancy. As illustrated in FIGS. 7 and 10, lock 90 includes a handle 92 attached to a threaded bolt 94 for a frictional lock against beam 42.

In the embodiment of the mobile hunting stand 10 illustrated, it should be understood that tower 12 preferably stands between about 8 feet and about 11 feet above the ground (or about 7 to about 10 feet above chassis 22) and includes a ladder 15 extending from chassis 22 to frame 28. The blind is about four feet on a side and is approximately square in cross section, and stands about 5 to about 7 feet high. With the blind fully upright, the overall height of the mobile hunting stand is about 15 to about 17 feet. Boom 48 is connected to blind 16 through rotating link 50 and bracket 52, being welded to link 50 which is pivotally attached to bracket 52. Link forms an obtuse angle of about 120° to about 160° with boom 48 in order to provide additional spacing between boom 48 and frame 28 in the final rotation of blind 16 to the upright position. Likewise, bracket 52 is preferably set out from side 16*s* from about three inches to about twelve inches where link 50 is pivotally attached, further providing set-off of boom 48 during the rotation of blind to the upright position.

In its preferred embodiment, mobile hunting stand 10 includes an accessories locker 96 secured to trailer 12 for carrying hunting supplies. Locker 96 may take a variety of forms, including one of the commercially available pick-up truck storage boxes. It is also preferable that trailer 12 be outfitted with platform 98 and ramp 99 to accommodate an all terrain vehicle or similar vehicle. Such additions are conventionally fabricated of expanded metal, framed according to the size of vehicle to be carried and secured to the trailer by welding, u-bolts or the like. Ramps are pivotally mounted to allow easy loading of the vehicle, and fitted with latches or other securing means to provide added means to retain the vehicle on board during transit.

The following is a list of the reference numbers and associated parts for the invention as shown and described:

| | |
|---|---|
| 10 | mobile dear stand |
| 12 | trailer |
| 14 | tower |
| 15 | ladder |
| 16 | blind |
| 16s | side of blind |
| 20 | struts |
| 22 | chassis |
| 24 | weldment |
| 26 | cross brace |
| 28 | frame |
| 30 | side rails |
| 31 | center rail |
| 32 | pivot plates |
| 33 | pivot pins |
| 34 | base |
| 35 | base rails |
| 36 | bolt and shaft |
| 38 | trailer tongue |
| 39 | tongue extension |
| 40 | channel |
| 40u | channel upper surface |
| 42 | coupling beam |
| 42b | beam bottom surface |
| 43 | beam extension |
| 44 | shuttle |
| 46 | lift link |
| 48 | lifting boom |
| 50 | rotating link |
| 52 | bracket |
| 54 | anchor shoe |
| 56 | extension |
| 57 | closed channel |
| 58 | key end |
| 60 | roller bearing |
| 62 | chain |
| 64 | eye |
| 66 | roller bearing |
| 66s | bearing surface |
| 68 | roller |
| 70 | roller mount |
| 72 | jack stand |
| 74 | roller |
| 76 | bracket |
| 78 | lateral brace |
| 78t | tube section |
| 80 | extension leg |
| 82 | lock |
| 84 | handle |
| 86 | stand |
| 88 | stand |

What is claimed is:

1. A mobile observation tower comprising:
   a trailer chassis having a forward end and a rearward end configured with a trailer tongue at its forward end to be pulled behind a tow vehicle; and
   a beam channel disposed on the trailer tongue and centered on the chassis extending rearwardly toward the rearward end of the trailer chassis; and
   a tower assembly secured to the trailer chassis generally centrally thereon, the tower assembly having pivotally attached thereto and supporting at its upper extent, one side of a generally rectangular observation station, rotatable from a lowered position to an upright position on the tower assembly at its upper extent; and
   a coupling beam disposed in the beam channel extending generally from the trailer tongue to a position rearwardly of the rearward end of the trailer chassis; and
   the coupling beam having a fastener disposed on its rearward end for releaseably securing the beam to an immoveable object; and
   the coupling beam having a pivot latch on its forward end, to which one end of a lifting boom is secured; and
   a lift link disposed on the side of the observation station generally opposite the side pivotally attached to the tower assembly, and the second end of the lifting boom being pivotally attached to the lift link;
      whereby when the coupling beam is secured to an immoveable object and the trailer chassis is pulled forward by the tongue, the coupling beam is drawn relatively rearwardly in the channel and causes the lifting boom to push on the lift link which rotates the observation station toward the upright position.

2. A mobile observation tower according to claim 1 wherein the channel has a low friction surface on which the coupling beam rides during rotation of the observation stand to the upright and lowered positions.

3. A mobile observation tower according to claim 2 wherein the channel low friction surface comprises roller bearings disposed in the trailer chassis and projecting above the channel contacting the coupling beam.

4. A mobile observation tower according to claim 1 wherein the coupling beam is retained in the channel by roller bearings mounted in brackets secured to the trailer chassis and disposed above the channel a distance wherein the coupling beam is received in the channel under the roller bearings.

5. A mobile observation tower according to claim 1 wherein the trailer tongue includes a leveling jack stand to stabilize the trailer chassis during use of the observation station.

6. A mobile observation tower according to claim 1 wherein the beam channel includes a leveling jack stand to stabilize the trailer chassis during use of the observation station.

7. A mobile observation tower according to claim 1 wherein the coupling beam has an extender section disposed on the rearward end of the coupling beam and the fastener is disposed on the end of the extender section whereby the length of the coupling beam may be extended to the location of the immoveable object.

8. A mobile observation tower according to claim 1 wherein the tower includes adjustable lateral supports to stabilize the trailer chassis during use of the observation station.

9. A mobile observation tower according to claim 1 wherein a ladder is disposed on the trailer chassis and extends upward to the top of the tower and is secured thereto.

10. A mobile observation tower according to claim 1 wherein the coupling beam includes a lock disposed at its forward end disposed to engage the beam channel to releaseably secure the coupling beam to the beam channel and trailer chassis during use of the observation station.

11. A mobile observation tower comprising:
    a trailer chassis having a forward end and a rearward end configured with a trailer tongue at its forward end to be pulled behind a tow vehicle; and
    a beam channel disposed on the trailer tongue and centered on the chassis extending rearwardly toward the rearward end of the trailer chassis; and
    a tower assembly secured to the trailer chassis generally centrally thereon, the tower assembly having pivotally attached thereto and supporting at its upper extent, one side of a generally rectangular observation station, rotatable from a lowered position to an upright position on the tower assembly at its upper extent; and
    the observation station including a housing forming a blind and having a base platform, upstanding sidewalls and a roof disposed on the sidewalls;
    a coupling beam disposed in the beam channel extending generally from the trailer tongue to a position rearwardly of the rearward end of the trailer chassis; and
    the coupling beam having a fastener disposed on its rearward end for releaseably securing the beam to an immoveable object; and
    the coupling beam having a pivot latch on its forward end, to which one end of a lifting boom is secured; and
    a lift link disposed on the side of the observation station generally opposite the side pivotally attached to the tower assembly, and the second end of the lifting boom being pivotally attached to the lift link;
    whereby when the coupling beam is secured to an immoveable object and the trailer chassis is pulled forward by the tongue, the coupling beam is drawn relatively rearwardly in the channel and causes the lifting boom to push on the lift link which rotates the observation station toward the upright position.

12. A mobile observation tower according to claim 11 wherein the blind includes a door disposed in one sidewall and a window in at least one sidewall.

13. A mobile observation tower according to claim 12 wherein a storage box is disposed on the trailer chassis adjacent the tower.

14. A mobile observation tower according to claim 12 wherein the trailer chassis is adapted with flooring and supports for receiving and transporting an all terrain vehicle.

15. A mobile observation tower according to claim 12 wherein the trailer tongue includes a leveling jack stand to stabilize the trailer chassis during use of the observation station.

16. A mobile observation tower according to claim 12 wherein the beam channel includes a leveling jack stand to stabilize the trailer chassis during use of the observation station.

17. A mobile observation tower according to claim 12 wherein the coupling beam has an extender section disposed on the rearward end of the coupling beam and the fastener is disposed on the end of the extender section whereby the length of the coupling beam may be extended to the location of the immoveable object.

18. A mobile observation tower according to claim 12 wherein the tower includes adjustable lateral supports to stabilize the trailer chassis during use of the observation station.

19. A mobile observation tower according to claim 12 wherein a ladder is disposed on the trailer chassis and extends upward to the top of the tower and is secured thereto.

20. A mobile observation tower according to claim 12 wherein the channel has a low friction surface on which the coupling beam rides during rotation of the observation stand to the upright and lowered positions.

21. A mobile observation tower according to claim 12 wherein the channel low friction surface comprises roller bearings disposed in the trailer chassis and projecting above the channel contacting the coupling beam.

22. A mobile observation tower according to claim 12 wherein the coupling beam retained in the channel by roller bearings mounted in brackets secured to the trailer chassis and disposed above the channel a distance wherein the coupling beam is received in the channel under the roller bearings.

23. A mobile observation tower according to claim 12 wherein the coupling beam includes a lock disposed at its forward end disposed to engage the beam channel to releasably secure the coupling beam to the beam channel and trailer chassis during use of the observation station.

24. A mobile observation tower according to claim 12 wherein the lift link pivotal attachment is spaced from the blind sidewall and the platform base a distance of between three and nine inches.

25. A mobile observation tower according to claim 12 wherein the coupling beam is retained in the channel by roller bearings mounted in brackets secured to the trailer chassis and disposed above the channel a distance wherein the coupling beam is received in the channel under the roller bearings.

* * * * *